July 8, 1969 W. C. AVREA 3,453,886

VISUAL OIL LEVEL INDICATOR

Filed Oct. 19, 1965

INVENTOR.
WALTER C. AVREA
BY
Beehler & Arant
ATTORNEYS.

United States Patent Office 3,453,886
Patented July 8, 1969

3,453,886
VISUAL OIL LEVEL INDICATOR
Walter C. Avrea, 539 Lucerne Ave.,
Placentia, Calif. 92670
Filed Oct. 19, 1965, Ser. No. 498,025
Int. Cl. G01f 23/02
U.S. Cl. 73—323     1 Claim

ABSTRACT OF THE DISCLOSURE

An oil level indicator for an automotive differential housing. The indicator includes a fastening bolt having an axial passage extending from an inner threaded end outwardly. An annular recess is formed around the shank of the bolt and the recess communicates with the passage. The bolt extends through a bushing and the threaded end of the bolt engages a threaded hole in the housing so as to secure the bushing at a desired angular position. The bushing has a radially extending opening in communication with the angular recess. An indicator tube is fastened in said opening, whereby a level of oil in the housing is visible in the indicator tube.

---

The invention relates to automotive equipment and has particular reference to a service accessory, by means of which a mechanic can readily check the oil level in a gear housing where gears operate in a closed housing in a bath of lubricating oil.

In the operation of certain kinds of motor vehicles, and in particular, commercial trucks used in daily hauling where considerable wear is experienced by certain parts, such as the differential, it is highly necessary to be certain that these parts are at all times properly lubricated. Consequently, after such a piece of automotive equipment has been operating steadily for a certain number of miles, the vehicle is regularly brought in for an inspection and servicing. Usually, about all a mechanic needs to know about the condition of an operating part, such as a differential housing, is whether or not there is an adequate amount of oil in the housing. The usual way to check this is to jack up the rear wheels, remove all of the bolts from a cover plate over an opening in the differential housing, then inspect the interior, and finally to reapply the cover. Even under those circumstances where a hole is provided in a differential housing for the accommodation of a threaded plug, the plug must be removed and then the oil level in the housing tested, usually by the mechanic inserting his finger into the hole to feel the level, after which the plug is replaced.

Where bolts have to be removed and a cover removed and then replaced, considerable mechanic's time is expended at a corresponding cost. This is especially disadvantageous for operators of large fleets of trucks. Where the the inspection is one accomplished by removing a small plug and feeling the level of the oil, the inspection is very unreliable as well as difficult and time consuming.

It is, therefore, among the objects of the invention to provide a new and improved oil gauge for gear housing, which is an easily read visual indicator capable of positively showing the correct level of oil in the housing.

Another object of the invention, is to provide a new and improved oil gauge assembly, capable of being attached to a gear housing through a hole normally present in the gear housing, thereby making the assembly one which can be easily and dependably installed without need for dismantling any portion of the housing or its cover.

Still another object of the invention is to provide a new and improved oil gauge assembly, which is capable of being fabricated from substantially standard commercial shapes, thereby making it one which is particularly inexpensive.

Still another object of the invention is to provide a new and improved oil gauge assembly, which is of such construction that it can be screwed into one of the customary threaded holes in a gear housing used normally for the attachment of a cover plate.

Still another object of the invention is to provide a new and improved oil gauge for a gear housing, which can be readily applied to the gear housing without any disassembly and which is sufficiently versatile so that it can be readily swung and adjusted to proper position and there tightened in place, so as to be capable of being accurately read at any time.

Still another object of the invention is to provide a new and improved oil gauge assembly, for indicating the oil level of various gear housings, such, for example is a differential housing for an automotive vehicle, which is constructed of relatively few parts and which requires no moving parts so that once installed and properly adjusted the gauge can always be accurately read with a minimum of time and effort.

With these and other objects in view, the invention consists in the construction, arrangement, and combination of the various parts of the device, whereby the objects contemplated are attained, as hereinafter set forth, pointed out in the appended claims and illustrated in the accompanying drawings.

Figure 2:
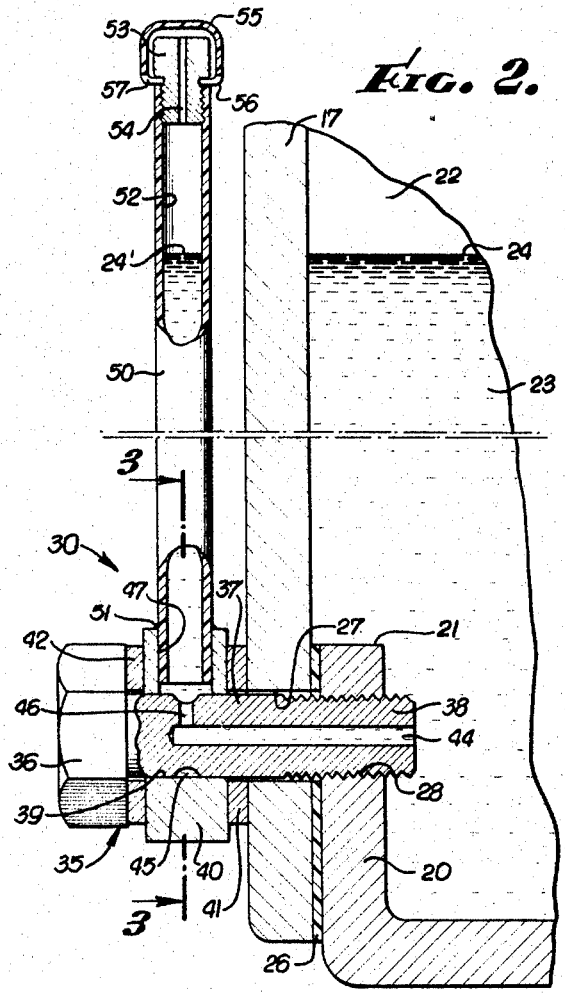
FIGURE 2 is a longitudinal sectional view taken on the line 2—2 of FIGURE 1.
Figure 3:
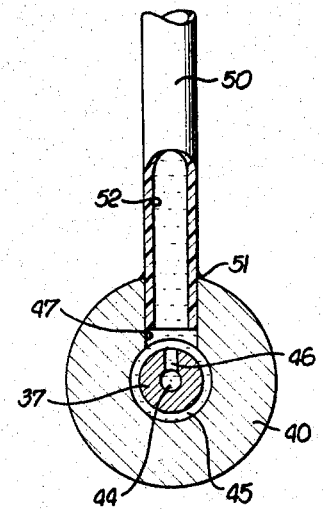
FIGURE 3 is a fragmentary longitudinal sectional view taken on the line 3—3 of FIGURE 2.

In the embodiment of the invention, which has been chosen by way of illustration, there is shown a standard differential housing 10 from which extend laterally the usual rear axle elements 11 and 12 and their respective jackets 13 and 14. A drive shaft 15 extending into the differential housing, is centered in a bonnet 16 attached to a cover plate 17 by means of bolts 18. The cover plate in turn, is attached to the housing 10 by bolts 19. As shown in FIGURE 2, the housing is provided with a flange 20, an innermost edge 21 of which defines an access opening for a chamber 22 which houses the customary differential gears (not shown) and provides for a bath or reservoir 23 of lubricating oil having a level 24 when at rest. Between the cover plate 17 and the flange 20 is a gasket 26 for sealing in the bath of oil and a hole 27 in the cover plate in axial alignment with a threaded hole 28 in the flange 20 serve with bolts 19 as a means of attaching the cover plate 17 to the housing 10.

Figure 1:
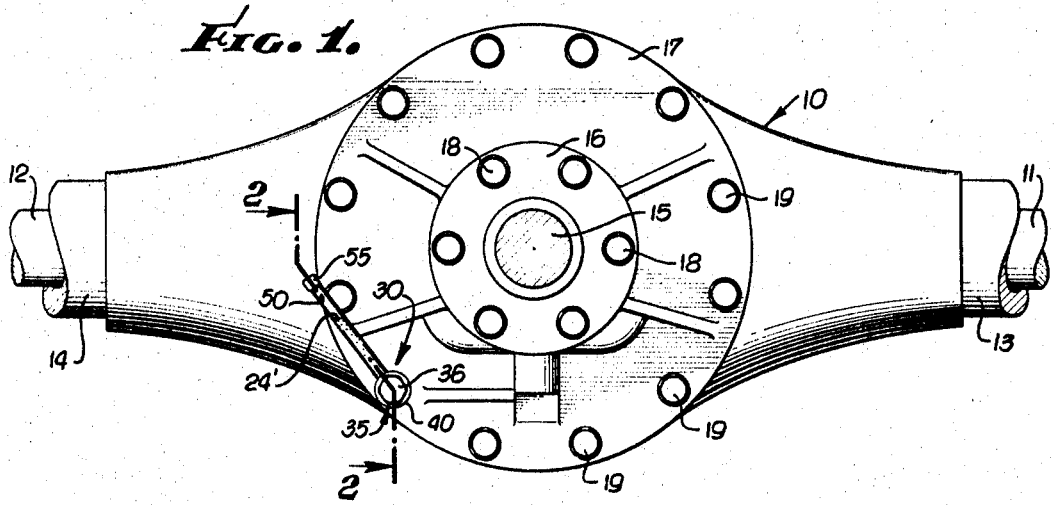
FIGURE 1 is an elevational view of a typical differential housing, showing the oil gauge mounted thereon in operative position.

The oil level indicator may be provided as an indicator assembly or unit, indicated generally by the reference character 30. As shown in FIGURES 1 and 2, the oil level indicator assembly is mounted in a set of aligned holes 27, 28 near the bottom of the housing, but high enough so that it extends above the level 24 of the bath of lubricating oil. To mount the indicator assembly it is necessary only to remove one of the bolts 19 and replace it with the indicator assembly.

More particularly, the assembly consists of a special stud 35 serving as a fastening element, the stud having a head 36, a shank 37 and a threaded end 38. The shank extends through an opening 39 in a bushing 40. A washer 41 is located between the bushing and the exterior face of the cover plate 17 and a second washer 42 is located between the head 36 and the adjacent face of the bushing 40, whereby the stud can be drawn into position by the threaded engagement described, thereby to mount the bushing in a selected position. The stud also serves additionally in the same fashion as the bolts 19.

Extending axially through the threaded end 38 and the shank 37 on the stud is a passage 44, which opens into the chamber 22 within the bath 23 of lubricating oil. An annular recess 45 around the shank 37 is connected to the passage 44 by a short passage 46. Extending radially outwardly from one side of the bushing 40 is a hole 47, open at the outside end and in communication at the inner end with the annular recess 45.

An indicator tube 50 is fastened in the hole 47 by threads or some appropriate adhesive 51, which seals the indicator tube in the hole. A central passage 52 in the indicator tube, is in communication with the annular recess 45 and hence, also in communication with the bath 23 of lubricating oil through the passage 44 in the stud. At the outer end of the indicator tube is a breather formed in this instance by employment of a plug 53, having a breather passageway 54 extending through it, the plug being in threaded engagement with the outer end of the indicator tube and having a protecting cap 55 fastened to the plug by crimped edges 56, the crimped edges being provided with openings 57 so as to vent the breather passageway 54.

When the oil level indicator assembly 30 is to be attached, one of the bolts 19 is removed and the stud 35 inserted in its place. The indicator tube 50 is then tilted to an appropriate angle, preferably upwardly, and perhaps extending obliquely outwardly, depending on local conditions as shown in FIGURE 1. The precise angular disposition of the indicator tube is not of consequence as long as the upper end extends well above the level 24 of the bath of lubricating oil 23. When the indicator tube is in the proper position the stud 35 is screwed snugly into position, whereby the hole 27 is sealed by employment of the washers 41 and 42. Employment of the washers and of a bushing 40, which can be rotated at will, makes it possible to properly position the indicator tube 50, irrespective of the location of the aligned holes 27, 28 into which the stud 35 is inserted. Considerable versatility and flexibility is achieved by this arrangement. Furthermore, by spacing the indicator tube 50 outwardly as it is by use of the washer 41 and an appropriate thickness of the bushing 40, the indicator tube will, on all occasions, swing clear of the heads of the other bolts 19.

It is important that the indicator tube be a transparent or a substantially transparent tube. A preferred material is one of the commercially available synthetic plastic resins, which is fabricated substantially clear, sufficient that oil is clearly visible in the tube. Oil in the tube, being free and in constant communication with oil in the housing 10 assures that a level 24 of oil in the indicator tube is exactly the same as the level 24 of oil in the housing. The tube, of course, is made of a diameter large enough so that there is no capillarity within the central passage 52. Accordingly, a mechanic by merely inspecting the oil lever 24 in the indicator tube 50 can determine whether or not there is oil in the housing at a level sufficient to provide the necessary lubrication.

Should the oil level indicator assembly ever need servicing or replacement, it is necessary only to remove the stud 35, then temporarily plug the hole 27, and thereafter replace the assembly with a substitute assembly and tighten it in place. Should there be some interval between removal and replacement of assemblies, the hole can be plugged with one of the conventiontal bolts 19.

Further, by reason of the fact that the stud 35 serves also the same purpose as the bolt 19, the oil level indicator assembly can remain in place at all times and be available for inspection, whether the vehicle is on the road or in the shop.

While the invention has herein been shown and described in what is conceived to be the most practical and preferred embodiment, it is recognized that departures may be made therefrom within the scope of the invention.

Having described the invention, what is claimed as new in support of Letters Patent is:

1. An oil level indicator for an automotive differential housing having a chamber for gears and oil, an access opening in said chamber, a cover plate sealing said access opening and a threaded hole through said housing at level below the level of oil therein, a hole in said cover plate in axial alignment with said threaded hole, said oil level indicator comprising: a fastening bolt having a head, a shank, a threaded inner end, an axial passage extending from the threaded end of said bolt outwardly, and an annular recess formed around said shank in communication with said passage; a bushing heaving a rotatable mounting on said bolt and an outwardly extending opening in communication with said annular recess; an indicator tube of transparent material mounted in said opening, said indicator tube having a covered vent at the outer end thereof; and said bolt adapted to pass through the hole in said cover plate and engage the threaded hole in said housing so as to seal said plate to said housing and to secure said bushing between the cover plate and said head at a selected position of rotation; the interior of said tube being in communication with said opening, said annular recess and said axial passage, whereby the level of oil in said chamber is visible in said indicator tube.

References Cited

UNITED STATES PATENTS

| | | | |
|---|---|---|---|
| 1,275,935 | 8/1918 | Jones | 73—323 |
| 1,210,385 | 12/1916 | Hunyiker | 73—323 |

FOREIGN PATENTS

| | | |
|---|---|---|
| 97,789 | 2/1923 | Switzerland. |
| 1,021,177 | 12/1957 | Germany. |

LOUIS R. PRINCE, *Primary Examiner.*

JOSEPH W. ROSKOS, *Assistant Examiner.*

U.S. Cl. X.R.

116—118